(No Model.)
H. A. WILLIAMS.
NUT LOCK.
No. 577,123.  Patented Feb. 16, 1897.
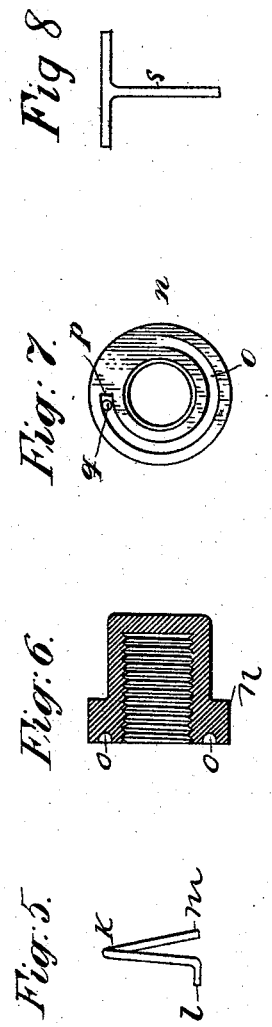
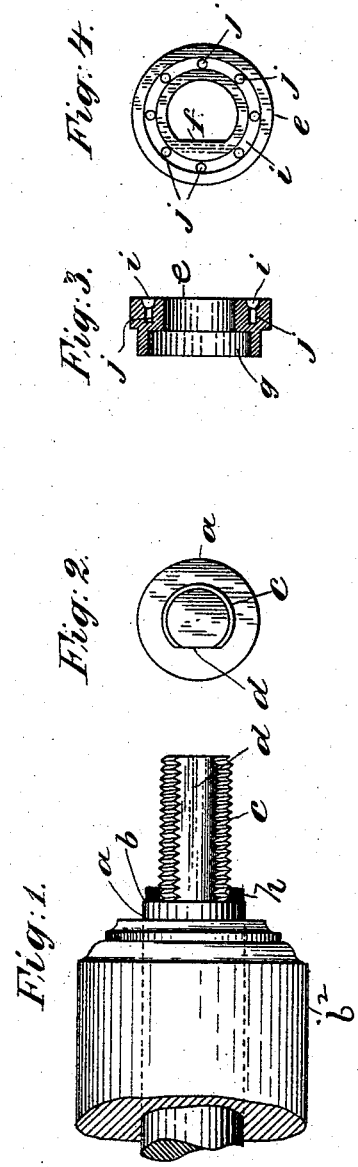
WITNESSES:
INVENTOR:
Henry A. Williams
By A. P. Thayer
Attorney.

UNITED STATES PATENT OFFICE.

HENRY ALEXIS WILLIAMS, OF WOLLASTON, MASSACHUSETTS.

NUT-LOCK.

SPECIFICATION forming part of Letters Patent No. 577,123, dated February 16, 1897.

Application filed May 8, 1896. Serial No. 590,650. (No model.)

*To all whom it may concern:*

Be it known that I, HENRY ALEXIS WILLIAMS, a citizen of the United States, and a resident of Wollaston, in the county of Norfolk and State of Massachusetts, have invented certain new and useful Improvements in Nut-Locks, of which the following is a specification.

My invention consists of a spring locking-pawl of wire bedded in an annular groove in the face of a washer and being adapted to be set in different positions around said bed, together with a circular groove in the face of the nut, having a terminal shoulder against which one end of the pawl-spring takes effect to lock the nut, as hereinafter described, reference being made to the accompanying drawings, in which—

Figure 1 is a side view of part of a carriage-axle and wheel-hub for which my improved nut-lock is especially adapted. Fig. 2 is an end view of the bolt. Fig. 3 is a section of the washer. Fig. 4 is a view of the face of the washer on which the nut bears. Fig. 5 is a side view of the spring-pawl. Fig. 6 is a section of the nut. Fig. 7 is a view of the face of the nut that bears on the washer. Fig. 8 is a view of a wire pusher for disengaging the pawl for releasing the nut.

In this example of my invention I represent a carriage-axle $a$, or it may be a bolt having a shoulder $b$, on which a washer $h$ is to be tightly clamped by the nut, as in the case of the axle-bearing of a wheel-hub $b^2$ of a vehicle, for which my improved lock-nut is particularly applicable, but it is also applicable for bolts generally, and I also represent the threaded part $c$ of the bolt as made with a flat side $d$ for a stop to prevent the washer $e$, having a corresponding side $f$ of its hole, from working slack by the shocks and jars of use. The under side of the washer has an annular recess $g$ for receiving a leather or other elastic washer $h$ for clamping on the shoulder $b$ in cases like axle-bearings, where it is desirable for the nut to be screwed hard down without tightening the wheel-hub too much for turning freely.

In the upper face of the washer is an annular groove $i$ with sockets $j$ bored at intervals along the bottom parallel with the axis of the washer.

$k$ represents a wire spring-pawl suitably shaped to lie in the groove $i$ and having one end portion $l$ bent suitably to project into a socket $j$ and the other end portion $m$ set so as to spring upward above the surface of the washer.

The nut $n$ has a like groove $o$, extending partly around its face that seats on the washer, but terminating in a shoulder $p$, against which the end $m$ of spring-pawl $k$ catches when the nut is screwed up to lock the nut against turning backward, the other end $l$ of said spring-pawl being confined in one of the sockets $j$ by the nut for its base-support to resist the nut. A hole $q$ is bored from the upper side of the nut into the groove $o$, a little in advance of the shoulder $p$, for inserting a wire $s$ to press the end $m$ of the pawl down for releasing the nut, when it is to be unscrewed, this being necessary at each of two or three turns of the nut, after which the shoulder will escape the pawl without pressing the pawl.

The multiplication of sockets $j$ in the washer is to enable the spring-pawl to be adjusted so that it will take effect when the nut is sufficiently tight, the position of which may be determined by first screwing up the nut and marking the position of the shoulder and then removing the nut and adjusting the pawl accordingly.

It is not essential that the nut be grooved except for clearance, enabling the pawl to engage the shoulder, as the washer-groove may be deep enough to afford all the space for the pawl; but it will probably be preferable in practice to provide the pawl-space partly in each. The nut may also have two or more stop-shoulders, if desired.

I claim—

The combination in a nut-lock, of a washer having the pawl-groove in its face and one or more sockets bored in the bottom of the groove, the wire spring-pawl adapted to lie in the pawl-groove and engage one of the sockets, a nut adapted to confine the end of the pawl engaging a socket in said groove and having a stop-shoulder in its face adapted to be engaged by the other end of the pawl, said nut also having a hole in the relation to the stop-shoulder enabling the nut to be released from the pawl substantially as described.

Signed at New York city, in the county and State of New York, this 27th day of March, A. D. 1896.

HENRY ALEXIS WILLIAMS.

Witnesses:
W. J. MORGAN,
JAS. G. ALEXANDER.